US012627175B2

(12) United States Patent
Nunoya

(10) Patent No.: US 12,627,175 B2
(45) Date of Patent: May 12, 2026

(54) CONTACTLESS POWER FEEDING FACILITY

(71) Applicant: Daifuku Co., Ltd., Osaka (JP)

(72) Inventor: Makoto Nunoya, Gamo-gun (JP)

(73) Assignee: Daifuku Co., Ltd., Osaka (JP)

( * ) Notice: Subject to any disclaimer, the term of this patent is extended or adjusted under 35 U.S.C. 154(b) by 483 days.

(21) Appl. No.: 18/378,903

(22) Filed: Oct. 11, 2023

(65) Prior Publication Data

US 2024/0128800 A1      Apr. 18, 2024

(30) Foreign Application Priority Data

Oct. 12, 2022    (JP) ................................. 2022-163965

(51) Int. Cl.
| | |
|---|---|
| *H02J 50/40* | (2016.01) |
| *B60L 5/00* | (2006.01) |
| *B60L 9/00* | (2019.01) |
| *B60L 53/12* | (2019.01) |
| *B60M 3/00* | (2006.01) |
| *B60M 7/00* | (2006.01) |
| *H01F 38/14* | (2006.01) |
| *H02J 50/00* | (2016.01) |

(Continued)

(52) U.S. Cl.
CPC .............. *H02J 50/40* (2016.02); *B60L 5/005* (2013.01); *B60L 9/00* (2013.01); *B60L 53/12* (2019.02); *B60M 3/00* (2013.01); *B60M 7/00* (2013.01); *H01F 38/14* (2013.01); *H02J 50/005* (2020.01); *H02J 50/10* (2016.02); *H02J 50/12* (2016.02)

(58) Field of Classification Search
CPC .. B60L 5/005; B60L 53/12; B60L 9/00; H02J 50/10; H02J 50/40; H02J 50/005; H02J 50/12; B60M 7/00; B60M 3/00; H01F 38/14
See application file for complete search history.

(56) References Cited

U.S. PATENT DOCUMENTS

| | | | | |
|---|---|---|---|---|
| 7,138,614 B2 * | 11/2006 | Youm | ...................... | H02J 50/40 |
| | | | | 363/16 |
| 10,325,717 B2 * | 6/2019 | Boys | ........................ | H01F 38/14 |
| 10,727,693 B2 * | 7/2020 | Wang | .................... | H02J 50/402 |

(Continued)

FOREIGN PATENT DOCUMENTS

| | | | | | |
|---|---|---|---|---|---|
| CN | 114172249 A | * | 3/2022 | ............... | H02J 7/02 |
| JP | 200267747 A | | 3/2002 | | |

(Continued)

*Primary Examiner* — Cheng Lin
(74) *Attorney, Agent, or Firm* — The Webb Law Firm

(57) ABSTRACT

A contactless power feeding facility includes a coupling unit electromagnetically coupling a target feeder line and an adjacent feeder line. A target power supply apparatus includes: a phase detector detecting the induced current phase which is the phase of an induced current flowing through the target feeder line by the electromagnetic induction via the coupling unit while an alternating current is supplied to the adjacent feeder line by an adjacent power supply apparatus; an alternating-current generator generating the alternating current to be supplied to the target feeder line; and a phase controller controlling the alternating-current generator such that the phase of the alternating current to be supplied to the target feeder approaches the induced current phase detected by the phase detector.

5 Claims, 6 Drawing Sheets

(51) Int. Cl.
_H02J 50/10_ (2016.01)
_H02J 50/12_ (2016.01)

(56) References Cited

U.S. PATENT DOCUMENTS

| | | | | |
|---|---|---|---|---|
| 2009/0003022 A1* | 1/2009 | Nunoya | .................. | H02J 50/40 |
| | | | | 363/78 |
| 2012/0326498 A1* | 12/2012 | Woronowicz | .......... | B60L 5/005 |
| | | | | 307/9.1 |

FOREIGN PATENT DOCUMENTS

| | | | | | | |
|---|---|---|---|---|---|---|
| JP | 2002067747 | A | * | 3/2002 | | |
| JP | 2007050799 | A | * | 3/2007 | | |
| JP | 4228540 | B2 | * | 2/2009 | | |
| JP | 7131344 | B2 | * | 9/2022 | .............. | H02J 50/60 |
| KR | 102277873 | B1 | * | 7/2021 | .............. | H02J 50/12 |

* cited by examiner

CONTACTLESS POWER FEEDING FACILITY

CROSS REFERENCE TO RELATED APPLICATION

This application claims priority to Japanese Patent Application No. 2022-163965, filed Oct. 12, 2022, the disclosure of which is hereby incorporated by reference in its entirety.

BACKGROUND OF THE INVENTION

1. Field of the Invention

The present invention relates to a contactless power feeding facility including: a plurality of feeder lines arranged along a moving route of a movable body having a power receiver; and a plurality of power supply apparatuses supplying an alternating current to the plurality of respective feeder lines, the contactless power feeding facility being configured to supply power to the power receiver in a contactless manner.

2. Description of Related Art

Japanese Unexamined Patent Application Publication No. 2002-67747 discloses a power supply facility (contactless power feeding facility) including a plurality of induction lines (47) as feeder lines where an alternating current flows arranged along a moving route of a movable body (V), and configured to supply power to the movable body (V) in a contactless manner (Reference numerals in the brackets in the background art are those in the literature to be referred to). To the plurality of induction lines (47), power supply apparatuses (inverters (M)) are connected to supply power to the respective induction lines (47). The movable body (V) including a power receiver (pickup coil (5)) travels with supply of power from the plurality of induction lines (47) while transferring the plurality of induction lines (47). For the smooth travel of the movable body (V), it is preferable that the power is stably supplied even in transfer sections of the induction lines (47), and it is important that alternating currents of the adjacent induction lines (V) are synchronized with each other.

In the power supply facility, optical transmission devices (51) are connected to the respective power supply apparatuses (inverters (M)). Then, a clock pulse signal specifying the electrical characteristics, such as the frequency, of the alternating current supplied from a specific inverter (M) to the induction line (47) is output from the optical transmission device (51) connected to the concerned inverter (M). The clock pulse signal is transmitted in parallel to the other plurality of inverters (M) via the optical transmission devices (51) respectively connected to the other inverters (M). The other inverters (M) output, based on the respective transmitted clock pulse signals, alternating currents synchronized with the alternating current output by the concerned inverter (M) that had output the clock pulse signal to the induction lines (47) connected to the respective inverters (M). Thus, the alternating currents flowing through the plurality of induction line (47) are synchronized with each other and the movable body (V) can be stably supplied with the power while transferring the plurality of induction lines (47), so that the movable body (V) can smoothly travel.

SUMMARY OF THE INVENTION

The transmission of a synchronizing signal serving as the reference, such as the clock pulse signal, to the respective power supply apparatuses to synchronize the plurality of power supply apparatuses based on the synchronizing signal also requires, in addition to the feeder lines, the arrangement of transmission lines for the synchronizing signal along the moving route and also requires a large number of signal transmission devices, such as the optical transmission device, for transmitting the synchronizing signal to the transmission lines. This tends to raise the material cost for the facility or increase the man-hours for installation. Further, a large number of signal transmission devices are required, and therefore the cost required for maintenance of the devices is likely to increase.

In view of the above-described circumstances, it is desired to provide a technology of appropriately synchronizing the alternating currents flowing through the feeder lines while reducing the material cost or the man-hours for installation in the contactless power feeding facility having the plurality of feeder lines arranged along the moving route of the movable body.

The contactless power feeding facility in view of the above is a contactless power feeding facility, including: a plurality of feeder lines arranged along a moving route of a movable body including a power receiver; and power supply apparatuses connected to the plurality of respective feeder lines to supply an alternating current to the connected feeder lines, the contactless power feeding facility being configured to supply power to the power receiver in a contactless manner, with one of the plurality of feeder lines as a target feeder line, with a power supply apparatus connected to the target feeder line as a target power supply apparatus, with a feeder line adjacent to the target feeder line along the moving route as an adjacent feeder line, and with a power supply apparatus connected to the adjacent feeder line as an adjacent power supply apparatus, the contactless power feeding facility further including: a coupling unit configured to electromagnetically couple the target feeder line and the adjacent feeder line, in which the target power supply apparatus includes: a phase detector configured to detect an induced current phase, which is the phase of an induced current flowing through the target feeder line by electromagnetic induction via the coupling unit while an alternating current is supplied to the adjacent feeder line by the adjacent power supply apparatus; an alternating-current generator configured to generate an alternating current to be supplied to the target feeder line; and a phase controller configured to control the alternating-current generator such that the phase of the alternating current to be supplied to the target feeder line approaches the induced current phase detected by the phase detector.

Conventionally, to synchronize the phases of the alternating currents supplied from the plurality of power supply apparatuses to the respective feeder lines, it has been required to supply the synchronizing signal to the plurality of power supply apparatuses using signal transmission lines and signal transmission devices. According to this configuration, the phase of the alternating current supplied from the adjacent power supply apparatus to the adjacent feeder line is detected as the induced current phase by the target power supply apparatus. Then, the target power supply apparatus controls the alternating-current generator such that the phase of the alternating current to be supplied to the target feeder line approaches the induced current phase and supplies the alternating current to the target feeder line. Thus, the alternating current flowing through the adjacent feeder line and the alternating current flowing through the target feeder line can be synchronized with each other without the use of the synchronizing signal from the signal transmission device.

The respective power supply apparatuses serve as the adjacent power supply apparatus and the target power supply apparatus, thereby enabling the synchronization of the alternating currents output from the respective power supply apparatuses of the contactless power feeding facility. Thus, this configuration can appropriately synchronize the alternating currents flowing through the feeder lines with one another while reducing the material cost and the man-hours for installation in the contactless power feeding facility having the plurality of feeder lines arranged along the moving route of the movable body. Further, the cost required for maintenance after installation can also be reduced.

Further features and advantages of the contactless power feeding facility will become apparent from the following description of exemplary and non-limiting embodiments described with reference to the drawings.

BRIEF DESCRIPTION OF THE DRAWINGS

The terms FIG., FIGS., Figure, and Figures are used interchangeably in the specification to refer to the corresponding figures in the drawings.

DESCRIPTION OF THE INVENTION

Figure 1:
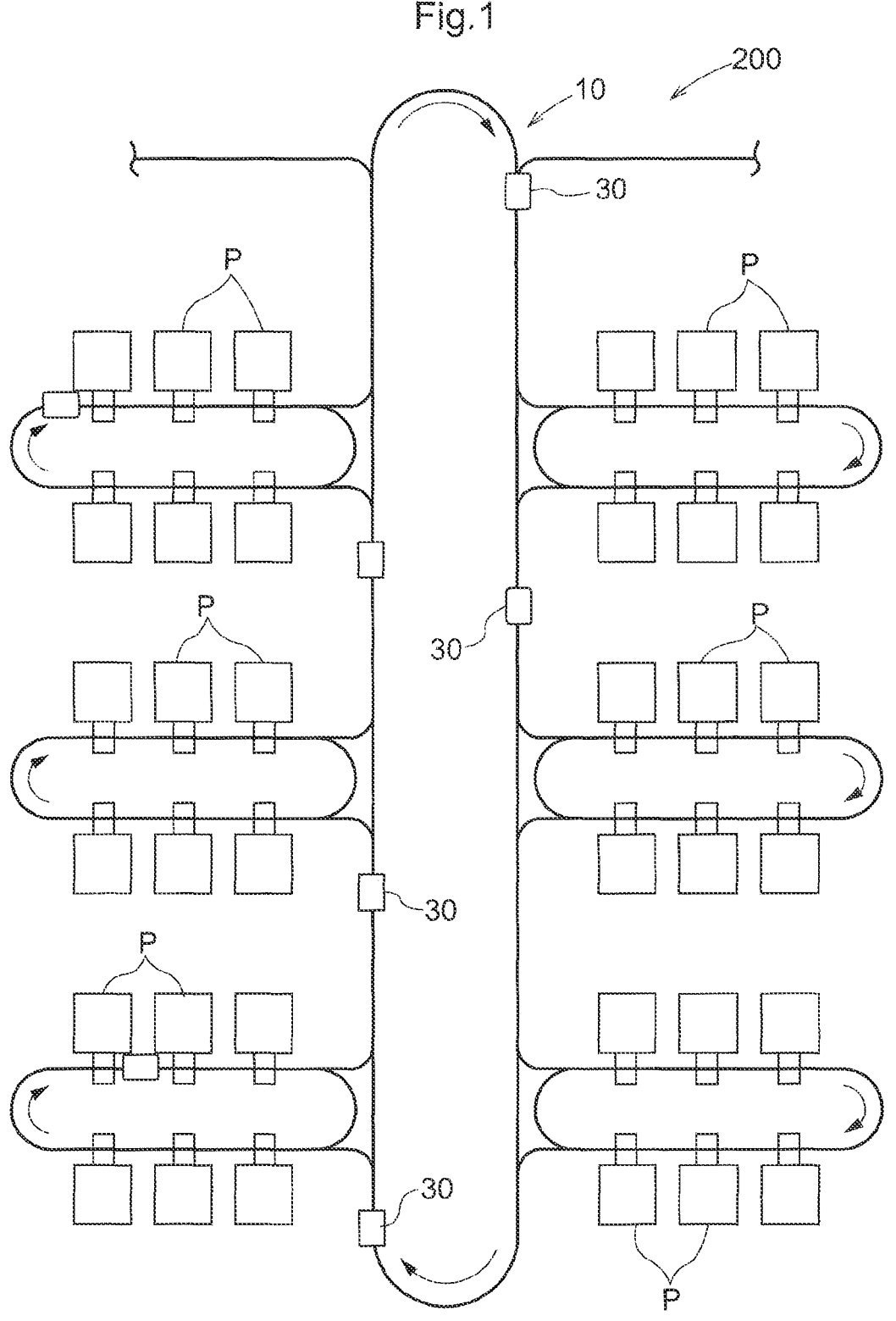
FIG. 1 is a plan view of an article transport facility including a contactless power feeding facility.
Figure 2:
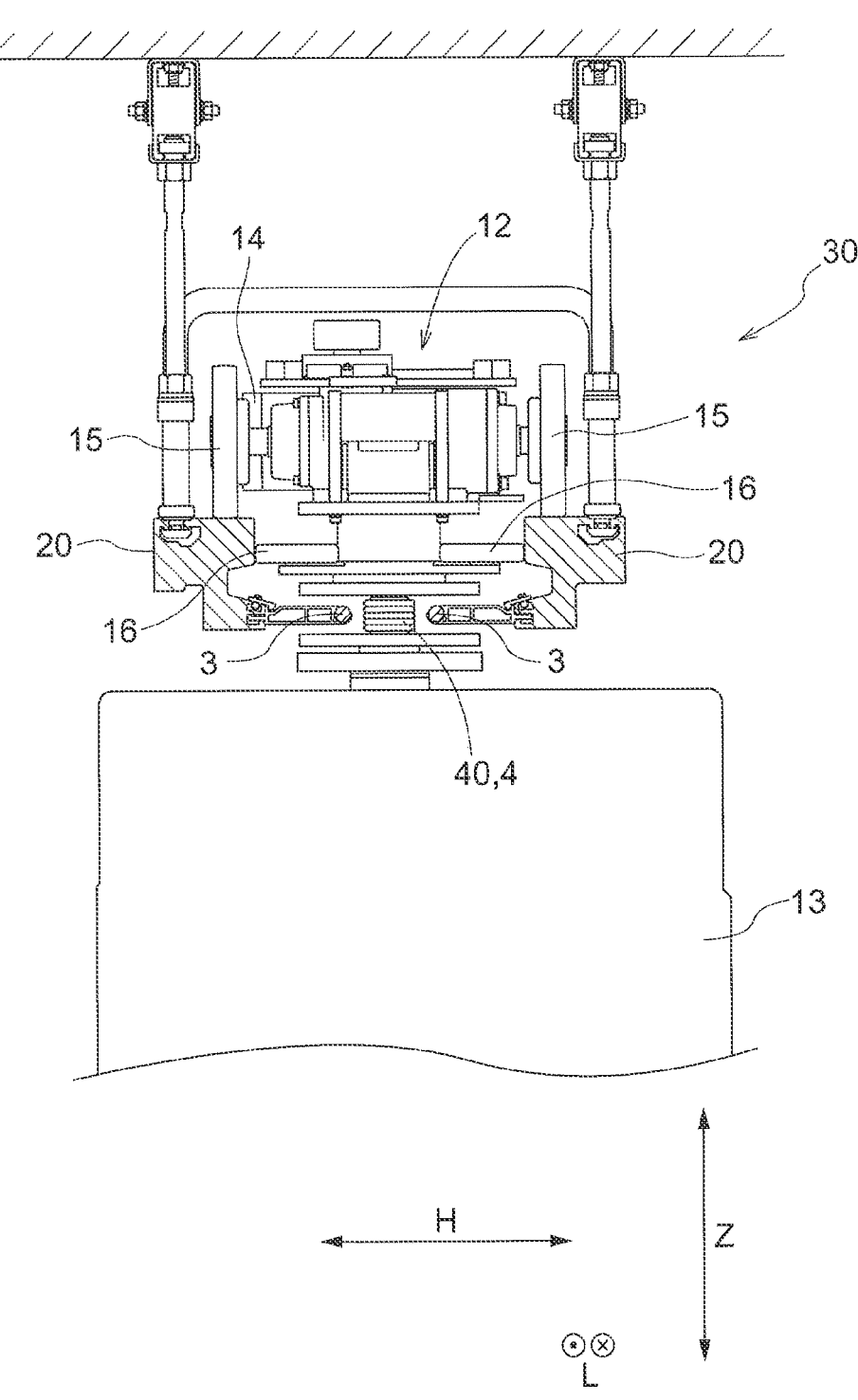
FIG. 2 is a front view of an article transport vehicle.

Hereinafter, an embodiment of a contactless power feeding facility is described taking a power supply facility supplying power to a movable body transporting an article in an article transport facility as an example. This embodiment gives the description taking an article transport vehicle 30 using travel rails 20 suspended from the ceiling of a building as a moving route 10 and moving along the travel rails 20 and transporting an article as illustrated in FIGS. 1, 2, for example, as one example of the movable body. The article transport vehicle 30 as the movable body is not limited to such an overhead transport vehicle traveling on the ceiling side as described above and may be another article transport vehicle, such as a floor transport vehicle or a stacker crane, using rails installed on the floor surface as the moving route 10 and moving along the rails and transporting an article. When the article transport vehicles are configured to contain a plurality of separated parts, such as a travel section and a body, not only the entire article transport vehicle but a part, e.g., only the travel section, may be considered to correspond to the movable body. For example, when the article transport vehicle is the overhead transport vehicle as in this embodiment, a travel section 12 described later may be considered to correspond to the movable body. In the case of the stacker crane, a travel truck on which a crane section is placed and supported may be considered to correspond to the movable body.

As illustrated in FIGS. 1 and 2, an article transport facility 200 according to this embodiment includes: the travel rails 20 arranged along the moving route 10 as the travel route of the article transport vehicles 30; and the article transport vehicles 30 guided by the travel rails 20 and traveling along the moving route 10. In this embodiment, the articles to be transported by the article transport vehicles 30 are a front opening unified pod (FOUP) housing semiconductor substrates, glass substrates serving as display materials, and the like, for example. The article transport facility 200 is also provided with a housing box (not illustrated) housing semiconductor substrates and article treatment sections P applying various kinds of treatment for forming circuits and the like on semiconductor substrates.

As illustrated in FIG. 2, in this embodiment, the article transport vehicle 30 includes the travel section 12 guided by the travel rails 20 forming a pair arranged to be suspended from and supported by the ceiling along the moving route 10 and traveling along the moving route 10, a body 13 positioned below the travel rails 20 and suspended from and supported by the travel section 12, and a power receiver 4 receiving drive power in a contactless manner from feeder lines 3 arranged along the moving route 10. Although the illustration and a detailed description are omitted, the body 13 includes an article support section provided vertically movable with respect to the body 13 and supporting the article in a suspended state. As described above, the article transport vehicle 30 corresponds to the movable body, but it can be said that only the travel section 12 corresponds to the movable body in a narrow sense.

The travel section 12 is provided with a pair of travel wheels 15 rotationally driven by an electric drive motor 14 as illustrated in FIG. 2. The travel wheels 15 roll on the travel surfaces formed by the upper surfaces of the travel rails 20. The travel section 12 is further provided with a pair of guide wheels 16 freely rotating around the axial center along a vertical direction Z (around the vertical axial center) in a state of abutting on the inner surfaces of the pair of travel rails 20. The travel section 12 further includes the drive motor 14 for traveling, a drive circuit for the drive motor 14, and the like, and causes the article transport vehicle 30 to travel along the travel rails 20. The body 13 is provided with an actuator vertically moving the article support section, an actuator driving a gripping section gripping the article, and the like, drive circuits for the actuators, and the like. The drive motor 14, the actuators, the drive circuits, and the like correspond to electrical loads LD (see FIG. 4) in the article transport vehicle 30.

The article transport facility 200 is provided with a facility controller which is not illustrated, and issues a transport command to each article transport vehicle 30 to cause each article transport vehicle 30 to transport the article. The article transport vehicle 30 autonomously travels based on the transport command, and, for example, delivers the article between the article treatment sections P and the article transport vehicle 30 and transports the article between the housing box (not illustrated) and the article treatment sections P described above.

Power to the drive motor 14, the various kinds of actuators, the drive circuits for driving them, and the like is supplied in a contactless manner from the feeder lines 3 to the power receiver 4. As described above, the feeder lines 3 supplying the drive power to the article transport vehicle 30 through the power receiver 4 are arranged along the moving route 10. In this embodiment, the feeder line 3 is arranged on each side in a route width direction H orthogonal to a route direction L as the direction along the moving route 10 (herein, direction orthogonal to both the route direction L and the vertical direction Z) with respect to the power receiver 4.

Figure 4:
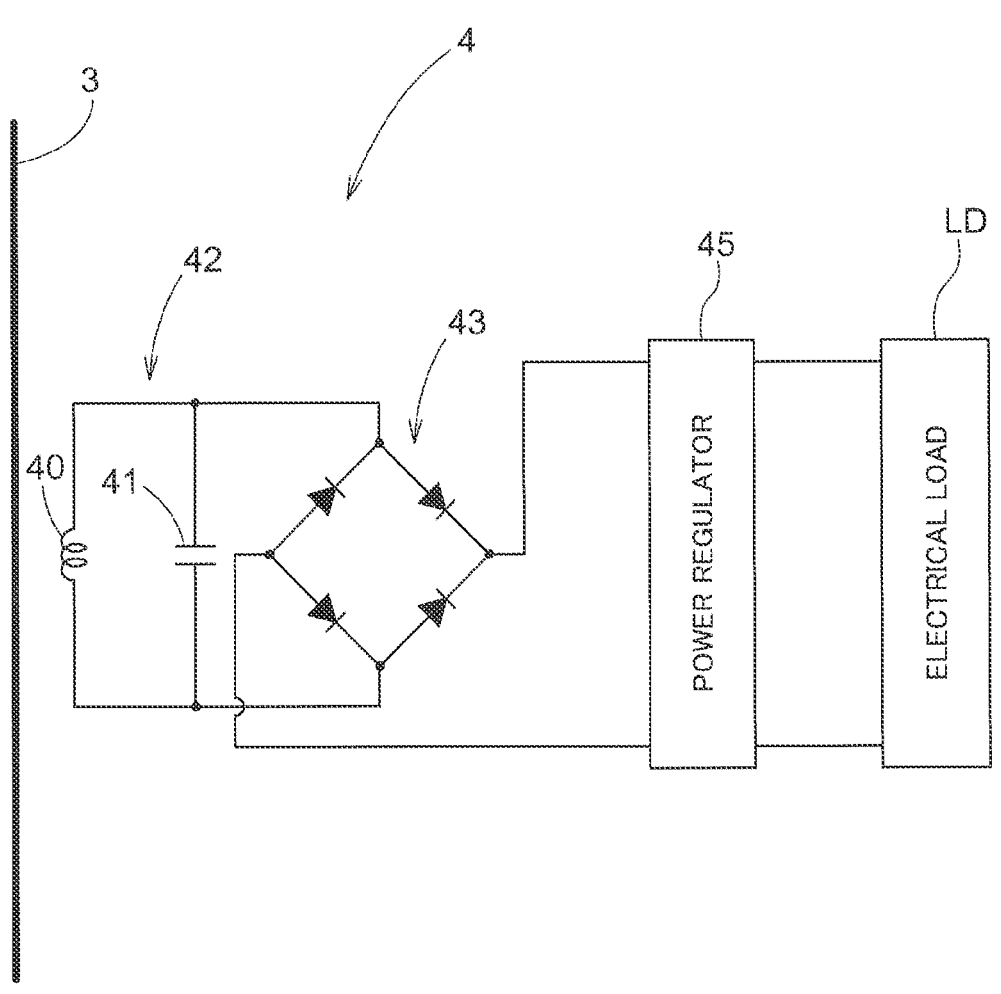
FIG. 4 is a schematic circuit block diagram illustrating the configuration of a power receiver.

As illustrated in FIG. 4 the power receiver 4 includes a pickup coil 40 (see FIG. 2) arranged in the article transport vehicle 30 to face the feeder line 3 and a power receiving circuit (details of which are described later) formed on a wiring board inside the article transport vehicle 30. A power supply apparatus 2 causes a high-frequency current to flow through the feeder line 3 as an induction line and generates a magnetic field around the feeder line 3. The pickup coil 40 generates induced electromotive force by an alternating current flowing through the feeder line 3. As illustrated in FIG. 4, the power receiving circuit is electrically connected to the pickup coil 40, and the electrical loads LD are connected to the power receiving circuit. The electrical loads LD are the drive motor 14 for traveling, the actuator vertically moving the article support section, the actuator driving the gripping section gripping the article, and the like, the drive circuits for the actuators, and the like described above, for example.

The power receiving circuit includes, for example, a part of a resonance circuit 42 constituted together with the pickup coil 40, a rectifier circuit 43, and a power regulator 45, such as a chopper and a regulator. Herein, a form is mentioned in which the resonance circuit 42 is formed as a parallel circuit of the pickup coil 40 and a resonance capacitor 41 as an example. The resonance circuit 42 is not limited thereto, and may be configured as a series resonance circuit in which a capacitor is connected in series to the pickup coil 40. The rectifier circuit 43 is connected in parallel to the resonance circuit 42 (resonance capacitor 41). The rectifier circuit 43 is connected to the pickup coil 40 (connected to the resonance circuit 42) to rectify an alternating current and an alternating-current voltage induced to the pickup coil 40 into a direct current and a direct-current voltage, respectively. Although this embodiment describes a form in which the rectifier circuit 43 is a full-wave rectifier circuit as an example, the rectifier circuit 43 may be a half-wave rectifier circuit. Although not illustrated, at least one of an output section from the rectifier circuit 43 and an output section from the power regulator 45 is suitably provided with a smoothing capacitor for smoothing a pulsating component.

Figure 3:
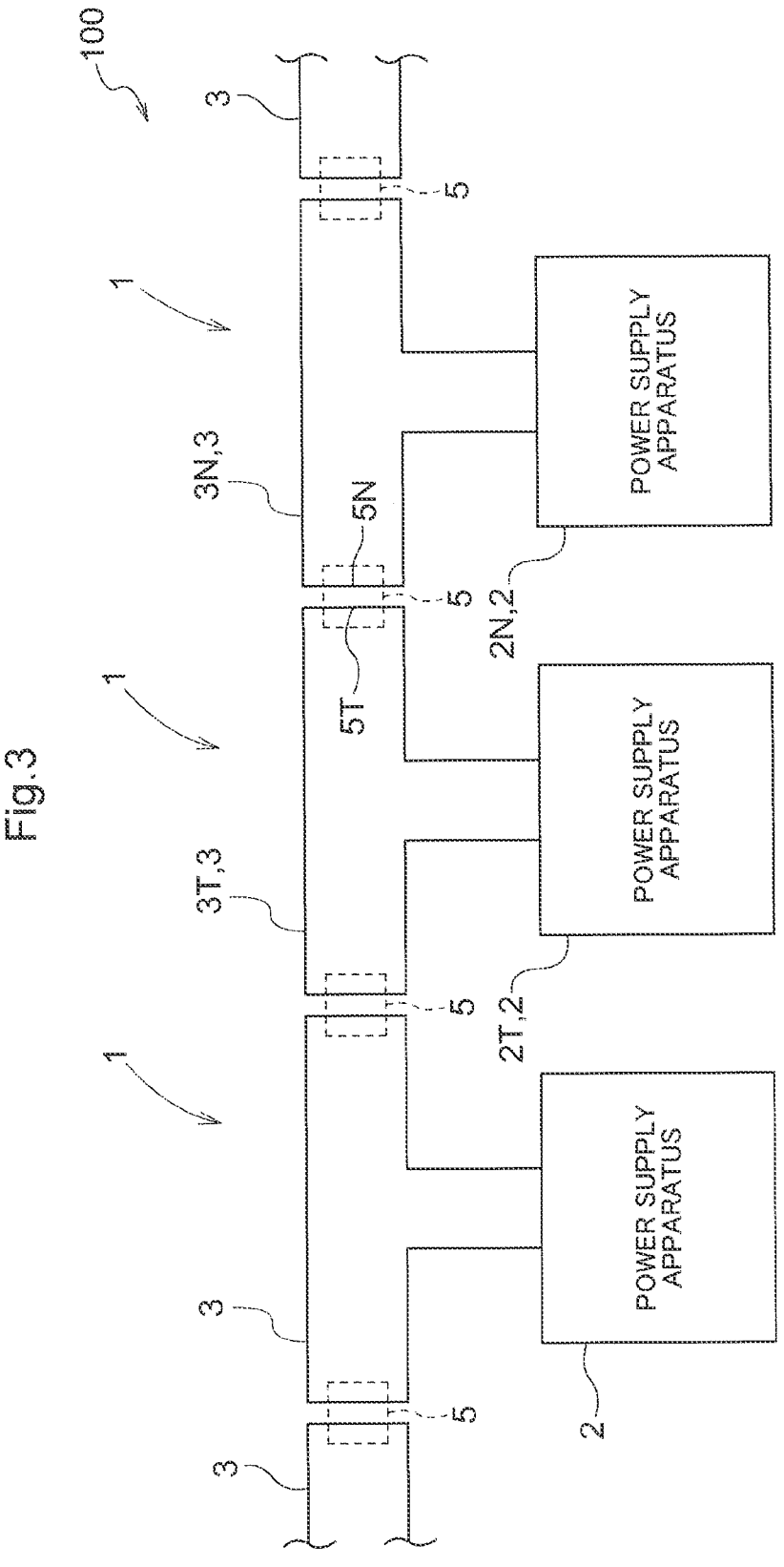
FIG. 3 is a schematic block diagram illustrating the system configuration of the contactless power feeding facility.

The contactless power feeding facility 100 of this embodiment supplies the drive power to the electrical loads LD of the article transport vehicle 30 using a wireless power feeding technology referred to as the HID (High Efficiency Inductive Power Distribution Technology). As illustrated in FIG. 3, the contactless power feeding facility 100 includes the feeder lines 3 and the power supply apparatuses 2 connected to the feeder lines 3 and supply an alternating current to the feeder lines 3. The power supply apparatus 2 causes a high-frequency current to flow through the feeder line 3 as the induction line and generates a magnetic field around the feeder line 3. The article transport facility 200 of this embodiment is a relatively large facility as illustrated in FIG. 1. Therefore, to suppress a reduction in the transmission efficiency and the shutdown of the entire facility in the event of a breakdown, not only one but a plurality of power feeding systems 1 including the feeder lines 3 and the power supply apparatuses 2 is provided. One power feeding system 1 supplies power to the plurality of article transport vehicles 30.

The article transport vehicle 30 travels in the article transport facility 200 with continuous supply of power while transferring the plurality of power feeding systems 1. For the smooth travel of the article transport vehicle 30, it is preferable that the power is stably supplied even in transfer sections of the power feeding systems 1, i.e., transfer sections of the feeder lines 3. Specifically, the phases of the alternating currents of the plurality of power feeding systems 1 are regulated to match each other, so that the article transport vehicle 30 can autonomously travel in the article transport facility 200 continuously receiving the supply of power from the plurality of power feeding systems 1.

Conventionally, to synchronize the phases of the alternating currents supplied from the plurality of power supply apparatuses 2 to the respective feeder lines 3, synchronizing signal transmission devices and signal transmission lines transmitting the synchronizing signal have been provided to supply the synchronizing signal to the respective power supply apparatuses 2, for example. The respective power supply apparatuses 2 have output the alternating currents such that the phases of the alternating currents match the phases of the alternating currents output from the other power supply apparatuses 2 based on the synchronizing signal. However, when such transmission devices and signal transmission lines are provided, the material cost for the facility tends to rise or the man-hours for installation tends to increase. Further, a large number of signal transmission devices are required, which tends to increase the cost required for maintenance of the devices. The contactless power feeding facility 100 of this embodiment can synchronize the alternating currents among the plurality of power feeding systems 1 without the use of such a synchronizing signal.

As described above, the contactless power feeding facility 100 of this embodiment includes the plurality of feeder lines 3 arranged along the moving route 10 of the movable body, such as the article transport vehicle 30 including the power receiver 4, and the plurality of power supply apparatuses 2 connected to the plurality of respective feeder lines 3 and supplying the alternating current to the connected feeder lines 3, and supplies power in a contactless manner to the respective power receivers 4. Herein, as illustrated in FIG. 3, one of the plurality of feeder lines 3 is defined as a target feeder line 3T, and the power supply apparatus 2 connected to the target feeder line 3T is defined as a target power supply apparatus 2T. Further, the feeder line 3 adjacent to the target feeder line 3T along the moving route 10 is defined as an adjacent feeder line 3N, and the power supply apparatus 2 connected to the adjacent feeder line 3N is defined as an adjacent power supply apparatus 2N.

Herein, for one set of the target feeder line 3T and the target power supply apparatus 2T, two sets of the adjacent feeder line 3N and the adjacent power supply apparatus 2N can be present in terms of the arrangement. However, in the following description, one of the two sets of the adjacent feeder line 3N and the adjacent power supply apparatus 2N is defined as the adjacent feeder line 3N and the adjacent power supply apparatus 2N. The target feeder lines 3T and the adjacent feeder lines 3N are not fixed, and all of the feeder lines 3 can serve as the target feeder lines 3T and the adjacent feeder lines 3N. The same applies also to the target power supply apparatuses 2T and the adjacent power supply apparatuses 2N.

As described later, the target feeder line 3T is the feeder line 3 to be regulated such that the phase of the alternating current matches the phase of the alternating current of the other feeder line 3, and the target power supply apparatus 2T is the power supply apparatus 2 outputting the alternating current such that the phases of the alternating currents match each other. For example, by sequentially setting the plurality of feeder lines 3 and the power supply apparatuses 2 connected to the plurality of feeder lines 3 to the target feeder lines 3T and the target power supply apparatuses 2T, respectively, the phases of the alternating currents flowing through the respective feeder lines 3 can be regulated from all of the power supply apparatuses 2. It is a matter of course that, in this case, the adjacent feeder line 3N and the adjacent power supply apparatus 2N are sequentially set according to the setting of the target feeder line 3T and the target power supply apparatus 2T.

Although details are described with reference to FIGS. 5 to 7, this embodiment is provided with coupling units 5 each electromagnetically coupling the target feeder line 3T and the adjacent feeder line 3N as illustrated in FIG. 3. As described above, all of the feeder lines 3 can serve as the target feeder lines 3T and the adjacent feeder lines 3N, and therefore the coupling unit 5 is suitably arranged in each gap between the adjacent feeder lines 3 as illustrated in FIG. 3. Although details are described later, the coupling unit 5 is a unit causing a part of the target feeder line 3T and a part of the adjacent feeder line 3N to function as a coil and electromagnetically coupling the adjacent feeder line 3N and the target feeder line 3T by mutual inductive action as illustrated in FIG. 7.

The electromagnetic coupling between the target feeder line 3T and the adjacent feeder line 3N by the coupling unit 5 causes the generation of an induced current in the target feeder line 3T by the alternating current flowing through the adjacent feeder line 3N. The target power supply apparatus 2T connected to the target feeder line 3T detects the induced current phase which is the phase of the induced current and outputs the alternating current to match the induced current phase, thereby enabling the synchronization of the alternating current flowing through the target feeder line 3T with the alternating current flowing through the adjacent feeder line 3N.

Figure 7:
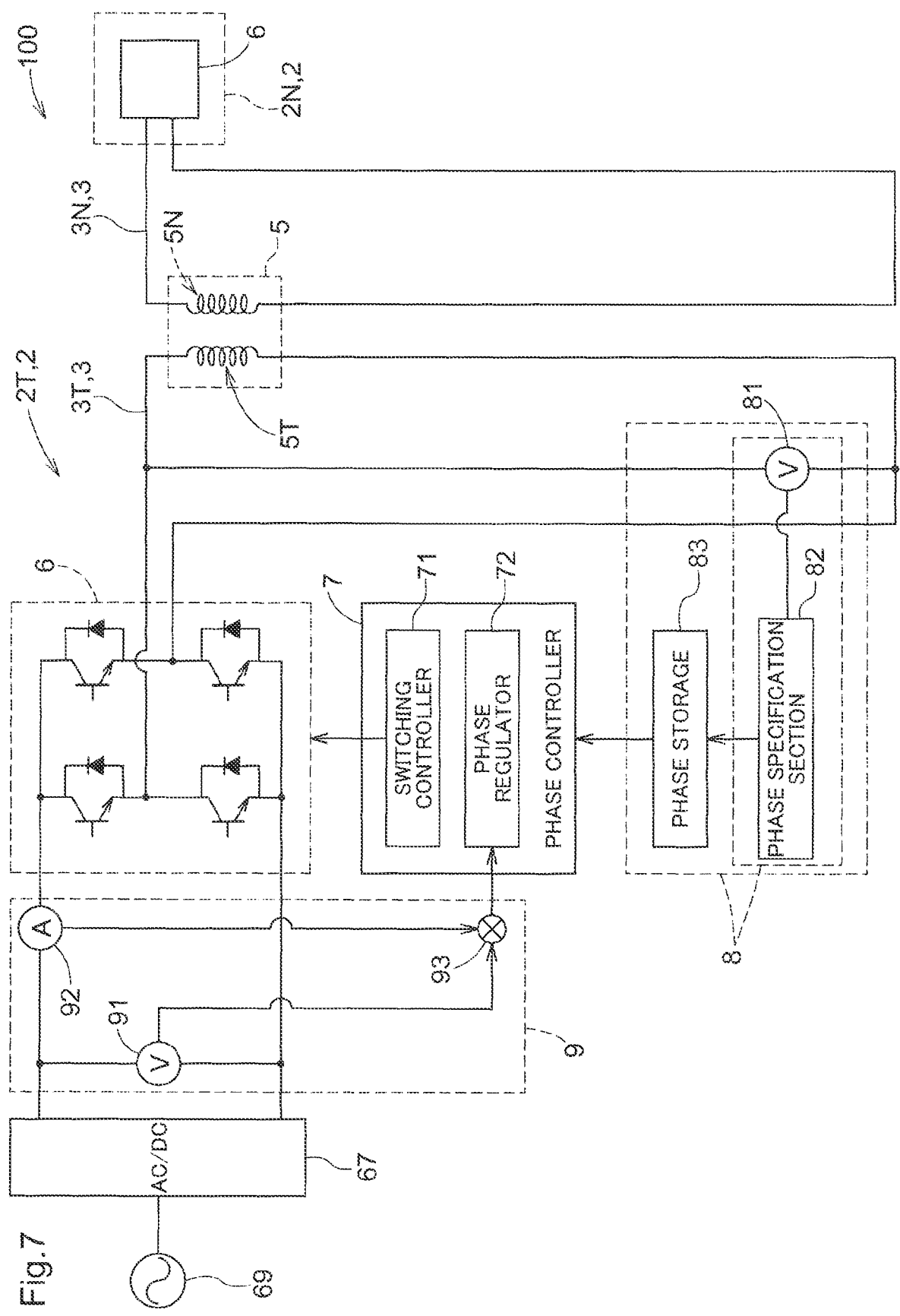
FIG. 7 is a block diagram illustrating one example of a power supply apparatus.

Therefore, the target power supply apparatus 2T includes a phase detector 8, a phase controller 7, and an alternating-current generator 6 as illustrated in FIG. 7. The other power supply apparatuses 2 each including the adjacent power supply apparatus 2N can also serve as the target power supply apparatuses 2T as appropriate, and therefore the power supply apparatuses 2 other than the target power supply apparatus 2T each also include the phase detector 8, the phase controller 7, and the alternating-current generator 6. Herein, the same applies also to descriptions of the other functional sections and the like provided in the target power supply apparatus 2T.

The phase detector 8 detects the induced current phase, which is the phase of the induced current flowing through the target feeder line 3T by the electromagnetic induction via the coupling unit 5, while the alternating current is supplied to the adjacent feeder line 3N by the adjacent power supply apparatus 2N. The phase controller 7 controls the alternating-current generator 6 such that the phase of the alternating current to be supplied to the target feeder line 3T approaches, preferably matches, the induced current phase detected by the phase detector 8. The alternating-current generator 6 generates the alternating current to be supplied to the target feeder line 3T. As illustrated in FIG. 7, the alternating-current generator 6 is constituted by a full-bridge circuit using a switching element, for example, and performs switching based on a switching control signal generated by the phase controller 7 and outputs the alternating current to the target feeder line 3T. It is a matter of course that the alternating-current generator 6 is not limited to the full-bridge circuit, and may also be the other structure, such as a half-bridge circuit.

The phase detector 8 includes at least an alternating-current voltage sensor 81 and a phase specification section 82. A form also may be acceptable in which an alternating-current sensor is provided in place of the alternating-current voltage sensor 81. More specifically, the phase detector 8 may include a sensor capable of detecting the electrical characteristics (frequency, phase) of the induced current induced to the target feeder line 3T, and the phase specification section 82 capable of specifying the induced current phase based on a detection result of the sensor. As one aspect, the alternating-current voltage sensor 81 suitably detects a both-end voltage of the target feeder line 3T in the coupling unit 5. The phase detector 8 may include the alternating-current voltage sensor 81, the phase specification section 82, and a phase storage 83 or may include the alternating-current voltage sensor 81 and the phase specification section 82 without including the phase storage 83 as described later.

The alternating-current generator 6 is a so-called inverter circuit constituted by a full bridge circuit, in which an alternating-current/direct-current converter (AC/DC converter 67) is connected to the direct-current side and the feeder line 3 is connected to the alternating-current side. To the AC/DC converter 67, a commercial power supply 69 is connected. The alternating-current generator 6 outputs the alternating current to the feeder line 3 with the supply of direct-current power from the alternating-current commercial power supply 69 via the AC/DC converter 67.

The phase controller 7 includes a switching controller 71 and a phase regulator 72. The phase regulator 72 regulates the phase of the alternating current output by the alternating-current generator 6 to approach the induced current phase detected by the phase detector 8 and sets a command value of the alternating current (further, a command value of the alternating-current voltage may also be set). When the alternating-current generator 6 is constituted by a voltage-controlled inverter circuit, for example, the switching controller 71 generates and outputs the switching control signal for controlling the switching of the alternating-current generator 6 based on the command value of the alternating-current voltage.

As illustrated in FIG. 7, in this embodiment, the phase detector 8 further includes a phase storage 83 storing the induced current phase. Further, on the direct-current side of the alternating-current generator 6, specifically between the AC/DC converter 67 and the alternating-current generator 6, a load power detector 9 detecting load power, which is power supplied to the target feeder line 3T by the target power supply apparatus 2T, is provided. More specifically, the target power supply apparatus 2T further includes the phase storage 83 and the load power detector 9.

In the alternating current, the relationship between the voltage phase and the current phase changes depending on the power consumption. In terms of the feeder line 3, the power consumption corresponds to the load power. When the power consumption of the electrical loads LD connected to the power receiver 4 increases or decreases, the alternating current flowing through the feeder line 3 undergoes a change in the current phase with respect to the voltage phase in response to a fluctuation in the power consumption. As described above, the electrical loads LD also include the drive motor 14 for the travel wheels 15 of the article transport vehicle 30 and the like. For example, the article transport vehicle 30 repeatedly stops and travels, but, when the vehicle stops, the power consumption is very small, and, when the vehicle starts or accelerates, the power consumption is larger than that during steady travel. In addition thereto, the article transport vehicle 30 includes the electrical loads LD, such as the actuator vertically moving the article support section and the actuator driving the gripping section gripping the article, and the power consumption fluctuates.

The phase controller 7 corrects the phase of the alternating current in response to the change in the phase difference of the alternating current flowing through the target feeder line 3T with respect to the alternating-current voltage applied to the target feeder line 3T depending on the load power, which is the power consumption of the electrical loads LD. More specifically, the phase controller 7 controls the alternating-current generator 6 to match the phase of the alternating current flowing through the target feeder line 3T with the induced current phase stored in the phase storage 83 in response to the change caused according to the load power in the phase difference. This makes it easy for the target power supply apparatus 2T to increase the matching degree between the phase of the alternating current to be supplied to the target feeder line 3T by the target power supply apparatus 2T and the phase of the alternating current to be supplied to the adjacent feeder line 3N by the adjacent power supply apparatus 2N, even when the load power changes.

As described above, the alternating-current generator 6 outputs the alternating current to the feeder line 3 with the supply of the direct-current power from the commercial power supply 69 via the AC/DC converter 67. Therefore, to increase the alternating-current power output to the feeder line 3, the direct-current power supplied from the commercial power supply 69 to the alternating-current generator 6 via the AC/DC converter 67 is also required to be increased. In other words, when the load power becomes larger, the alternating-current power output to the feeder line 3 becomes larger, so that the direct-current power on the direct-current side of the alternating-current generator 6 also becomes larger. More specifically, there is a correlation between the load power and the direct-current power.

As illustrated in FIG. 7, the load power detector 9 includes a direct-current voltage sensor 91, a direct-current sensor 92, and a multiplier 93, and detects the load power by detecting the direct-current power on the direct-current side of the alternating-current generator 6. Specifically, the load power is detected by multiplying a detection value of the direct-current voltage sensor 91 and a detection value of the direct-current sensor 92 by the multiplier 93. The phase controller 7 includes a map storage unit, which is not illustrated, storing map data illustrating the phase of the alternating current with respect to the load power, and the like, and regulates the phase of the alternating current based on the map data. In other words, the phase controller 7 feedback-controls the phase of the alternating current based on the load power.

To accurately detect the induced current phase, it is preferable that the amplitude of the induced current flowing through the target feeder line 3T is appropriately secured (large). Therefore, the coupling unit 5 is constituted such that the coupling degree of the electromagnetic coupling between the target feeder line 3T and the adjacent feeder line 3N is high. Specifically, as illustrated in FIGS. 5 and 6, the coupling unit 5 includes a target coil 5T constituted by a part of the target feeder line 3T, an adjacent coil 5N constituted by a part of the adjacent feeder line 3N, and a magnetic core 51. The target coil 5T, the adjacent coil 5N, and the magnetic core 51 are concentrically arranged. The "concentrically" means that the target coil 5T, the adjacent coil 5N, and the magnetic core 51 do not have to be arranged on the same axis and may be displaced to such extent that the electromagnetic coupling can be achieved. The magnetic core 51 is a ferrite core, for example.

The provision of the magnetic core 51 makes it easy to collect magnetic fluxes of the magnetic field generated by the current flowing through the adjacent coil 5N and electromagnetically couple a large number of fluxes with the target coil 5T to increase the amplitude of the induced current. Further, the concentric arrangement of the target coil 5T, the adjacent coil 5N, and the magnetic core 51 makes it easy to interlink the magnetic flux from the adjacent coil 5N with the magnetic core 51 and the target coil 5T and to increase the amplitude of the induced current.

Figure 5:
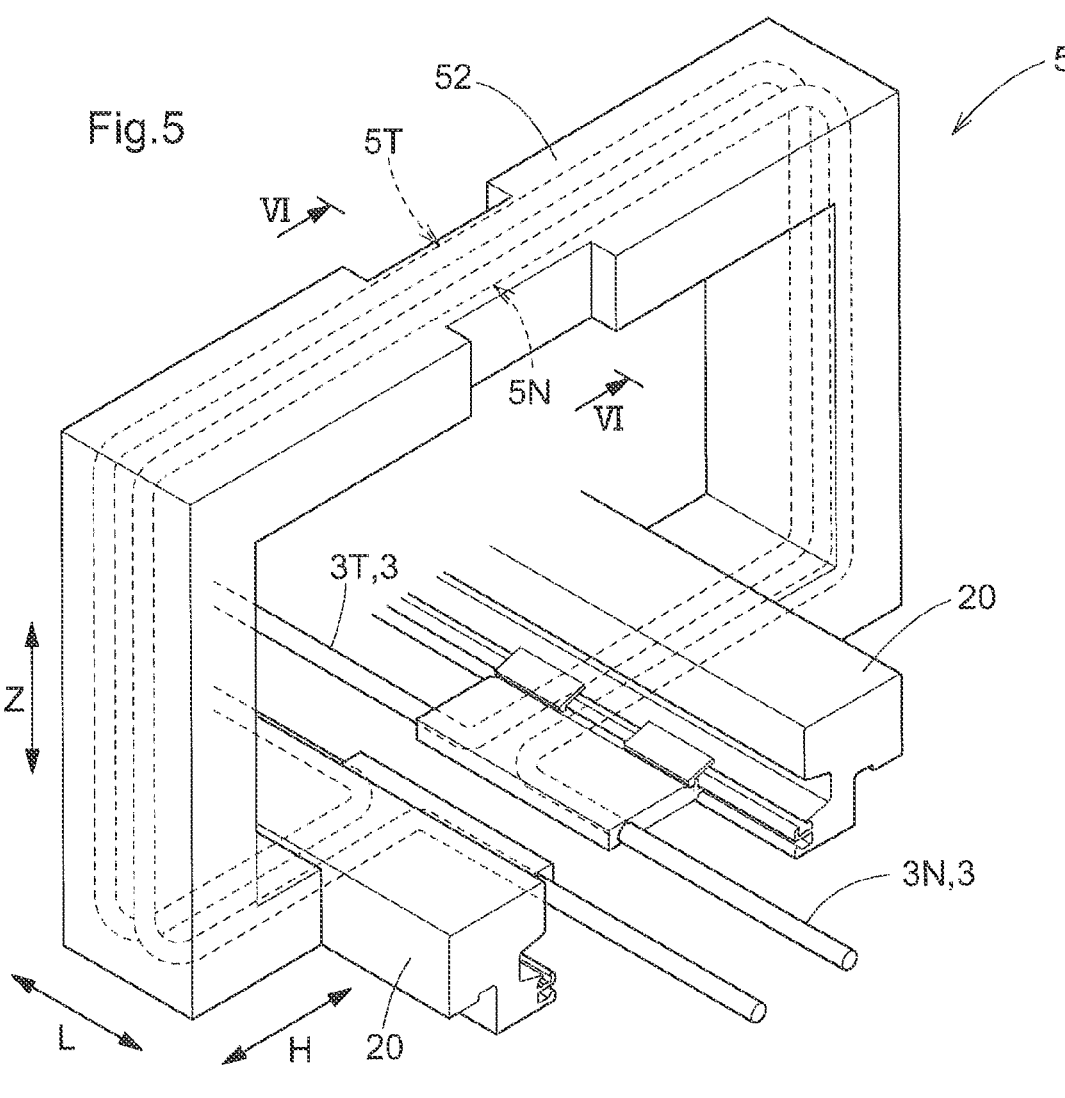
FIG. 5 is a perspective view illustrating one example of a coupling unit.
Figure 6:
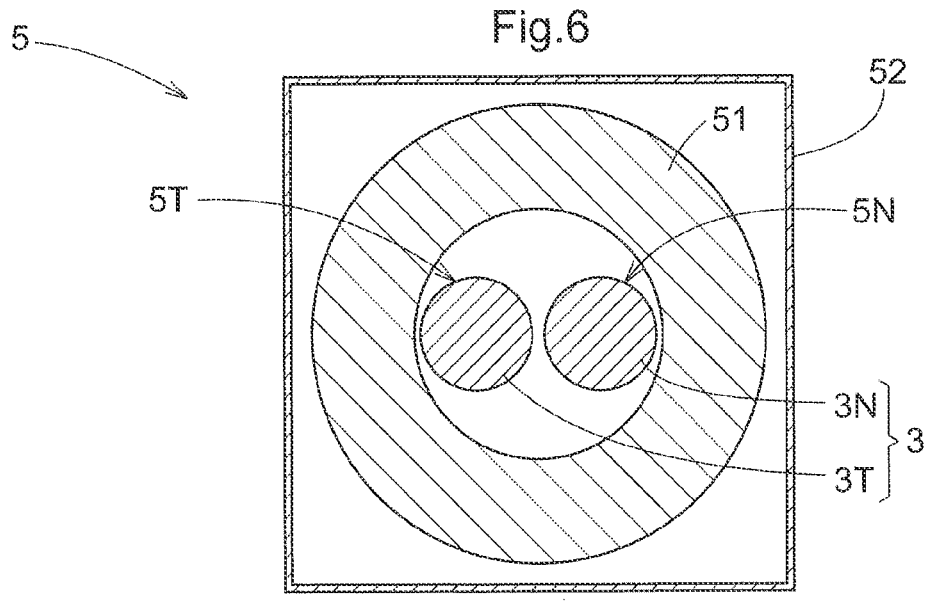
FIG. 6 is a cross-sectional view of the coupling unit.

As illustrated in FIG. 6, which is a cross-section along the VI-VI line in FIG. 5, the coupling unit 5 includes the target coil 5T, the adjacent coil 5N, the magnetic core 51, and a unit case 52 in this embodiment. The unit case 52 is formed of resin or the like, for example, and houses the magnetic core 51 inside. The unit case 52 has a ring shape to be able to surround the locus of movement of the travel section 12 as the movable body as illustrated in FIG. 5. For simplicity, although not illustrated in FIG. 5, the magnetic core 51 also has a ring shape to be able to surround the locus of movement of the travel section 12. Herein, the ring shape is not limited to a circular ring shape and also includes a rectangular ring shape. Further, the ring shape is not limited to a continuous ring shape, and may also be a partially missing ring shape.

In the form illustrated in FIG. 5, the magnetic core 51 is suitably formed into a rectangular ring shape, as with the unit case 52, of surrounding the locus of movement of the travel section 12 of the article transport vehicle 30 traveling on the travel rails 20 as the moving route 10 from three sides of the upper side in the vertical direction Z and both outer sides in the route width direction H with the lower side in the vertical direction Z being opened. In the target coil 5T and the adjacent coil 5N, the target feeder line 3T and the adjacent feeder line 3N are arranged to surround the locus of movement of the travel section 12 as with the magnetic core 51 from the three sides of the upper side in the vertical direction Z and both the outer sides in the route width direction H.

This embodiment describes the form in which the article transport vehicle 30 includes the travel section 12 traveling on the travel rails 20 and the body 13 suspended and supported by the travel section 12 as an example. Therefore, the form is given in which the coupling unit 5 is formed into a ring shape of surrounding the locus of running of the travel section 12 from the three sides with the lower part of the travel section 12 being opened as an example. However, in the case of the article transport vehicle in which the body is located above the travel section 12, for example, the coupling unit 5 may be formed into a ring shape of surrounding the locus of movement of the travel section 12 from all sides. It is a matter of course that the formation of the coupling unit 5 into a ring shape of surrounding the locus of movement of the entire article transport vehicle 30 including the body 13 from all sides is not precluded.

Also when the article transport vehicle is the floor transport vehicle, for example, it is difficult to arrange the coupling unit 5 below the floor in many cases. Therefore, also when the article transport vehicle is the floor transport vehicle, the floor transport vehicle is suitably formed into a rectangular ring shape of surrounding the locus of movement of the floor transport vehicle as the movable body from the three sides of the upper side in the vertical direction Z and both the outer sides in the route width direction H.

When the ring shape of surrounding the locus of movement is referred to, the surrounding object does not have to be the entire locus of movement. For example, in the case of the ring shape of surrounding the locus of movement from the three sides, it is not necessary for the coupling unit 5 to surround the entire range in the vertical direction Z in the route width direction H of the locus of movement when the locus of movement is surrounded from both the outer sides in the route width direction H of the locus of movement. More specifically, as viewed from the direction along the route width direction H, the entire coupling unit 5 does not have to overlap with the locus of movement, and the coupling unit 5 and the locus of movement may overlap in at least a part. Thus, even when the entire article transport vehicle 30 including the body 13 is the movable body and the locus of movement of the entire article transport vehicle 30 is targeted, it can be said that the coupling unit 5 surrounds the locus of movement from the three sides.

As illustrated in FIG. 6, the magnetic core 51 is hollow and cylindrical, for example, and the target feeder line 3T and the adjacent feeder line 3N corresponding to the target coil 5T and the adjacent coil 5N, respectively, are arranged in the cylindrical space inside in the radial direction. Thus, the target coil 5T, the adjacent coil 5N, and the magnetic core 51 are arranged along the same plane. More specifically, the target coil 5T, the adjacent coil 5N, and the magnetic core 51 are arranged to surround the locus of movement of the travel section 12 along the plane intersecting the route direction L. Therefore, the coupling unit 5 can be appropriately arranged such that the target feeder line 3T and the adjacent feeder line 3N are electromagnetically coupled with a high coupling degree without hindering the movement of the article transport vehicle 30 along the moving route 10. Herein, the form is described in which the magnetic core 51 containing the target coil 5T and the adjacent coil 5N in the target feeder line 3T and the adjacent feeder line 3N, respectively, is housed in the unit case 52 as an example, but a configuration in which the coupling unit 5 is constituted without the unit case 52 is not precluded.

The phase detector 8 suitably detects the induced current phase when no alternating current is supplied to the target feeder line 3T by the target power supply apparatus 2T. The detection of the induced current phase by the phase detector 8 may be carried out while the alternating current is output to the target feeder line 3T from the target power supply apparatus 2T. In this case, however, there is a possibility that the detection accuracy of the induced current phase decreases due to the effect of the alternating current supplied from the target power supply apparatus 2T to the target feeder line 3T. The alternating current supplied from the target power supply apparatus 2T and the induced current are superimposed, so that phases may be detected in two places, for example. The target power supply apparatus 2T already finds the phase of the alternating current output from the target power supply apparatus 2T. Therefore, even when the phases are detected in a plurality of places, the induced current phase can be specified by removing the concerned phase of the alternating current. However, when the two phases are close to each other, the phases are difficult to distinguish, reducing the detection accuracy of the induced current phase in some cases.

Therefore, the phase detector 8 suitably detects the induced current phase when no alternating current is supplied to the target feeder line 3T by the target power supply apparatus 2T. The current flowing through the target feeder line 3T is almost only the current induced by the current flowing through the adjacent feeder line 3N. Therefore, the detection accuracy of the induced current phase is easily enhanced without being affected by the alternating current supplied from the target power supply apparatus 2T to the target feeder line 3T.

As one suitable aspect, it is suitable in the contactless power feeding facility 100 including the plurality of power feeding systems 1 that the power feeding systems 1 are sequentially started. For example, it is supposed that the contactless power feeding facility 100 includes n power feeding systems 1 in the order of the first power feeding system 1, the second power feeding system 1, and the third power feeding system 1. First, the first power feeding system 1 is started while the power supply apparatuses 2 are suspended in all of the power feeding system 1. At this point, there is no power feeding system 1 to synchronize with.

Next, the power supply apparatus 2 and the feeder line 3 of the second power feeding system 1 adjacent to the first power feeding system 1 are set to the target power supply apparatus 2T and the target feeder line 3T, respectively. The power supply apparatus 2 and the feeder line 3 of the first power feeding system 1 correspond to the adjacent power supply apparatus 2N and the adjacent feeder line 3N, respectively. As described above, the first power feeding system 1 is operated, and therefore the current flowing through feeder line 3 of the first power feeding system 1 causes the generation of the induced current in the feeder line 3 of the second power feeding system 1. The power supply apparatus 2 of the second power feeding system 1 supplies the alternating current synchronized with the alternating current flowing through the feeder line 3 of the first power feeding system 1 to the feeder line 3 of the second power feeding system 1.

Next, the power supply apparatus 2 and the feeder line 3 of the third power feeding system 1 adjacent to the second power feeding system 1 are set to the target power supply apparatus 2T and the target feeder line 3T, respectively. The power supply apparatus 2 and the feeder line 3 of the second power feeding system 1, which have served as the target power supply apparatus 2T and the target feeder line 3T, correspond to the adjacent power supply apparatus 2N and the adjacent feeder line 3N, respectively. As described above, the current flowing through the feeder line 3 of the second power feeding system 1 operated synchronously with the first power feeding system 1 causes the generation of the induced current in the feeder line 3 of the third power feeding system 1. The power supply apparatus 2 of the third power feeding system 1 is started to supply the alternating current synchronized with the alternating current flowing through the feeder line 3 of the second power feeding system 1 to the feeder line 3 of the third power feeding system 1. The alternating current flowing through the feeder line 3 of the first power feeding system 1 and the alternating current flowing through the feeder line 3 of the second power feeding system 1 are synchronized with each other. Thus, the alternating current flowing through the feeder line 3 of the first power feeding system 1, the alternating current flowing through the feeder line 3 of the second power feeding system 1, and the alternating current flowing through the feeder line 3 of the third power feeding system 1 are synchronized with one another.

On and after, the fourth power feeding system 1, the fifth power feeding system 1, . . . , the n–1st power feeding system 1, and the n-th power feeding system 1 are sequentially started. When the alternating current is supplied to the feeder line 3 of the n-th power feeding system 1 with use of the power supply apparatus 2 and the feeder line 3 of the n–1st first power feeding system 1 as the adjacent power supply apparatus 2N and the adjacent feeder line 3N, respectively, and with use of the power supply apparatus 2 and the feeder line 3 of the n-th power feeding system 1 as the target power supply apparatus 2T and the target feeder line 3T, respectively, the alternating current flowing through the n feeder lines 3 from the first power feeding system 1 to the n-th power feeding system 1 are synchronized with one another.

Hereinafter, the other embodiments are described. The configurations of the embodiments described below are not limited to those applied alone, and can also be applied in combination with the configurations of the other embodiments insofar as no contradiction arises.

(1) It is described above that the detection of the induced current phase by the phase detector 8 may be carried out while the alternating current is output to the target feeder line 3T from the target power supply apparatus 2T. For example, when the phase detector 8 detects the induced current phase after all of the power feeding systems 1 are started, the current phase can be finely regulated during the operation of the contactless power feeding facility 100. The configuration in which the induced current phase is detected while the alternating current is output to the target feeder line 3T from the target power supply apparatus 2T and a configuration in which the induced current phase is detected while no alternating current is output to the target feeder line 3T from the target power supply apparatus 2T are not necessarily exclusive. The target power supply apparatus 2T may be configured to be able to detect the induced current phase in any state. For example, when the contactless power feeding facility 100 is started, the induced current phase may be detected while no alternating current is supplied to the target feeder line 3T, and, after the contactless power feeding facility 100 is started, the induced current phase may be detected while the alternating current is supplied to the target feeder line 3T.

(2) The description above describes the form in which the target power supply apparatus 2T includes the phase storage 83 storing the induced current phase as an example. However, the phase controller 7 may control the alternating-current generator 6 using the induced current phase specified by the phase specification section 82 in real time without including the phase storage 83. For example, in the case of an operation in which the target power supply apparatus 2T detects the induced current phase only at the start of the contactless power feeding facility 100, the phase storage 83 does not have to be provided. It is a matter of course that the phase storage 83 may be provided together with the operation in which the target power supply apparatus 2T detects the induced current phase only at the start of the contactless power feeding facility 100.

(3) The description above describes the configuration in which the target power supply apparatus 2T includes the load power detector 9 as an example. However, the target power supply apparatus 2T does not have to include the load power detector 9. As described above, a fluctuation in the load power changes the phase difference between the phase of the alternating-current voltage in the feeder line 3 and the phase of the alternating current. The phase difference at the start of the contactless power feeding facility 100 is almost the phase difference at no load, and therefore the phase controller 7 can find the effect of the change in the electrical loads LD based on a difference between the phase difference at this time and the phase difference after the article transport facility 200 is operated. The phase controller 7 may regulate the phase of the alternating-current voltage, e.g., regulate the switching control signal of the alternating-current generator 6 constituted by a voltage-controlled inverter circuit, and change the phases of the alternating-current voltages such that the phases of the alternating currents are synchronized. In this case, the phase of the alternating current can be regulated even when no load power is detected. Therefore, a form in which the target power supply apparatus 2T does not include the load power detector 9 is not precluded.

(4) The description above describes the form in which the coupling unit 5 includes the magnetic core 51 as an example, but the magnetic core 51 does not have to be provided when the target coil and the adjacent coil can be arranged to be electromagnetically coupled with a sufficiently high coupling degree. Further, the target coil 5T and the adjacent coil 5N may also be arranged close to each other in a straight line. Therefore, the target coil 5T and the adjacent coil 5N do not have to be arranged in a concentric ring shape irrespective of the presence or absence of the magnetic core 51. Further, the target coil 5T and the adjacent coil 5N may be arranged close to each other in a straight line, and therefore the target coil 5T, the adjacent coil 5N, and the magnetic core 51 do not have to be arranged to surround the moving route 10 along the plane intersecting the route direction L irrespective of the presence or absence of the magnetic core 51.

Hereinafter, a brief description of the contactless power feeding facility described above is given.

As one aspect, the contactless power feeding facility, including: the plurality of feeder lines arranged along the moving route of the movable body including the power receiver; and the power supply apparatuses connected to the plurality of respective feeder lines to supply the alternating current to the connected feeder lines, the contactless power feeding facility being configured to supply power to the power receiver in a contactless manner, with one of the plurality of feeder lines as a target feeder line, with the power supply apparatus connected to the target feeder line as the target power supply apparatus, with the feeder line adjacent to the target feeder line along the moving route as the adjacent feeder line, and with the power supply apparatus connected to the adjacent feeder line as the adjacent power supply apparatus, the contactless power feeding facility further including: the coupling unit configured to electromagnetically couple the target feeder line and the adjacent feeder line, and the target power supply apparatus includes: the phase detector configured to detect the induced current phase, which is the phase of the induced current flowing through the target feeder line by the electromagnetic induction via the coupling unit while the alternating current is supplied to the adjacent feeder line by the adjacent power supply apparatus; the alternating-current generator configured to generate the alternating current to be supplied to the target feeder line; and the phase controller configured to control the alternating-current generator such that the phase of the alternating current to be supplied to the target feeder line approaches the induced current phase detected by the phase detector.

Conventionally, to synchronize the phases of the alternating currents supplied from the plurality of power supply apparatuses to the respective feeder lines, it has been required to supply the synchronizing signal to the plurality of power supply apparatuses using signal transmission lines and signal transmission devices. According to this configuration, the phase of the alternating current supplied from the adjacent power supply apparatus to the adjacent feeder line is detected as the induced current phase by the target power supply apparatus. Then, the target power supply apparatus controls the alternating-current generator such that the phase of the alternating current to be supplied to the target feeder line approaches the induced current phase and supplies the alternating current to the target feeder line. Thus, the alternating current flowing through the adjacent feeder line and the alternating current flowing through the target feeder line can be synchronized with each other without the use of the synchronizing signal from the signal transmission device. Then, the respective power supply apparatuses serve as the adjacent power supply apparatus and the target power supply apparatus, thereby enabling the synchronization of the alternating currents output from the respective power supply apparatuses of the contactless power feeding facility. Thus, this configuration can appropriately synchronize the alternating currents flowing through the feeder lines with one another while reducing the material cost and the man-hours for installation in the contactless power feeding facility having the plurality of feeder lines arranged along the moving route of the movable body. Further, the cost required for maintenance after installation can also be reduced.

Further, the phase detector suitably detects the induced current phase while no alternating current is supplied to the target feeder line by the target power supply apparatus.

According to this configuration, the current flowing through the target feeder line is almost only the current induced by the current flowing through the adjacent feeder line. Therefore, the detection accuracy of the induced current phase is easily enhanced without being affected by the alternating current supplied from the target power supply apparatus to the target feeder line.

Further, the target power supply apparatus suitably further includes: the phase storage storing the induced current phase; and the load power detector detecting the load power, which is the power supplied to the target feeder line by the target power supply apparatus, in which the phase controller controls the alternating-current generator to match a phase of a alternating current flowing through the target feeder line with the induced current phase stored in the phase storage in response to the change caused according to the load power in the phase difference of the alternating current flowing through the target feeder line with respect to the alternating-current voltage applied to the target feeder line.

In the alternating current, the relationship between the voltage phase and the current phase changes by the load. Therefore, the current phase of the target feeder line and the current phase of the adjacent feeder line are shifted from each other in response to the load fluctuation at the power supply destination via the target feeder line. This configuration can correct the phase shift according to the load power detected by the load power detector to match the dielectric current phase stored in the phase storage. Therefore, this configuration makes it easy to increase the matching degree between the phase of the alternating current supplied to the target feeder line by the target power supply apparatus and the phase of the alternating current supplied to the adjacent feeder line by the adjacent power supply apparatus.

It is suitable that the coupling unit includes the target coil constituted by a part of the target feeder line, the adjacent coil constituted by a part of the adjacent feeder line, and that the magnetic core, and that the target coil, the adjacent coil, and the magnetic core are concentrically arranged.

The provision of the magnetic core makes it easy to collect magnetic fluxes of the magnetic field generated by the current flowing through the adjacent coil and electromagnetically couple a large number of fluxes with the target coil to increase the amplitude of the induced current. Further, the concentric arrangement of the target coil, the adjacent coil, and the magnetic core makes it easy to interlink the magnetic flux from the adjacent coil with the magnetic core and the target coil and to increase the amplitude of the induced current. More specifically, this configuration makes it easy to increase the coupling degree (coupling coefficient) of the electromagnetic coupling between the target feeder line and the adjacent feeder line by the coupling unit and to increase the amplitude of the induced current to enhance the detection accuracy of the induced current phase.

It is suitable that the magnetic core is formed in a ring shape, and that the target coil, the adjacent coil, and the magnetic core are arranged to surround the locus of movement of the movable body along the plane intersecting the route direction with the direction along the moving route as the route direction.

This configuration enables the coupling unit to be appropriately arranged such that that the target feeder line and the adjacent feeder line are electromagnetically coupled with a high coupling degree without hindering the movement of the movable body along the moving route.

What is claimed is:

1. A contactless power feeding facility, comprising:
a plurality of feeder lines arranged along a moving route of a movable body comprising a power receiver; and
power supply apparatuses connected to the plurality of respective feeder lines to supply an alternating current to the connected feeder lines,
wherein the contactless power feeding facility is configured to supply power to the power receiver in a contactless manner,
with one of the plurality of feeder lines as a target feeder line,
with a power supply apparatus connected to the target feeder line as a target power supply apparatus,
with a feeder line adjacent to the target feeder line along the moving route as an adjacent feeder line, and
with a power supply apparatus connected to the adjacent feeder line as an adjacent power supply apparatus,
the contactless power feeding facility further comprising:
a coupling unit configured to electromagnetically couple the target feeder line and the adjacent feeder line, and
wherein:
the target power supply apparatus comprises:
    a phase detector configured to detect an induced current phase, which is a phase of an induced current flowing through the target feeder line by electromagnetic induction via the coupling unit while an alternating current is supplied to the adjacent feeder line by the adjacent power supply apparatus;
    an alternating-current generator configured to generate an alternating current to be supplied to the target feeder line; and
    a phase controller configured to control the alternating-current generator such that a phase of the alternating current to be supplied to the target feeder line approaches the induced current phase detected by the phase detector.

2. The contactless power feeding facility according to claim 1, wherein:
the phase detector is configured to detect the induced current phase while no alternating current is supplied to the target feeder line by the target power supply apparatus.

3. The contactless power feeding facility according to claim 2, wherein:
the target power supply apparatus further comprises:
    a phase storage configured to store the induced current phase; and a load power detector configured to detect a load power which is power supplied to the target feeder line by the target power supply apparatus, and the phase controller is configured to control the alternating-current generator to match a phase of an alternating current flowing through the target feeder line with the induced current phase stored in the phase storage in response to a change caused according to the load power in a phase difference of the alternating current flowing through the target feeder line with respect to an alternating-current voltage applied to the target feeder line.

4. The contactless power feeding facility according to claim 1, wherein:

the coupling unit comprises:

a target coil constituted by a part of the target feeder line;

an adjacent coil constituted by a part of the adjacent feeder line, and a magnetic core, and the target coil, the adjacent coil, and the magnetic core are concentrically arranged.

5. The contactless power feeding facility according to claim 4, wherein:

the magnetic core is formed in a ring shape, and with a direction along the moving route as a route direction, the target coil, the adjacent coil, and the magnetic core are arranged to surround a locus of movement of the movable body along a plane intersecting the route direction.

\* \* \* \* \*